F. W. FORT.
NUTCRACKER.
APPLICATION FILED JULY 12, 1913.
1,117,945.
Patented Nov. 17, 1914.
2 SHEETS—SHEET 1.
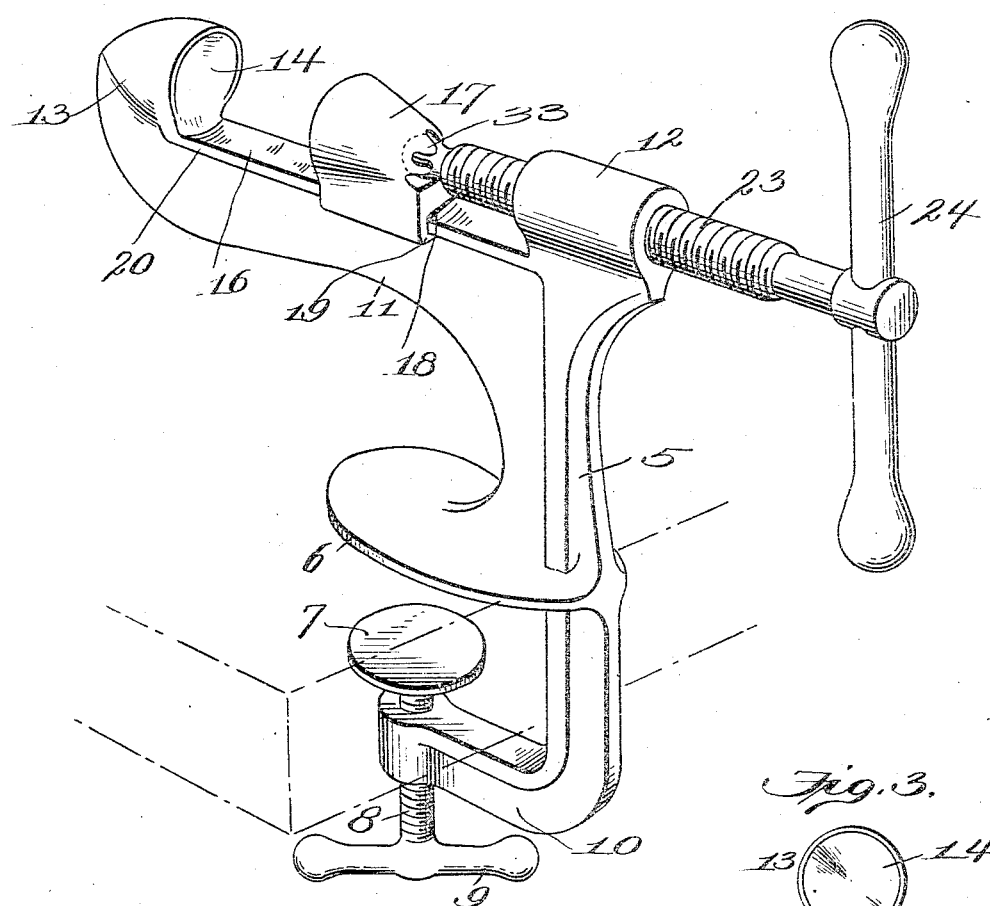
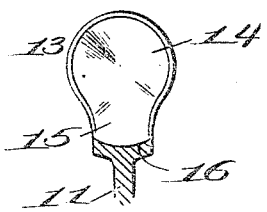
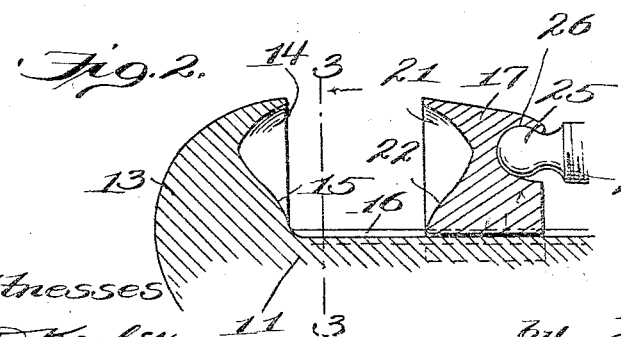
Witnesses
Inventor
Foster W. Fort
by
James L. Norris,
Attorney F. W. FORT.
NUTCRACKER.
APPLICATION FILED JULY 12, 1913.
1,117,945.
Patented Nov. 17, 1914.
2 SHEETS—SHEET 2.
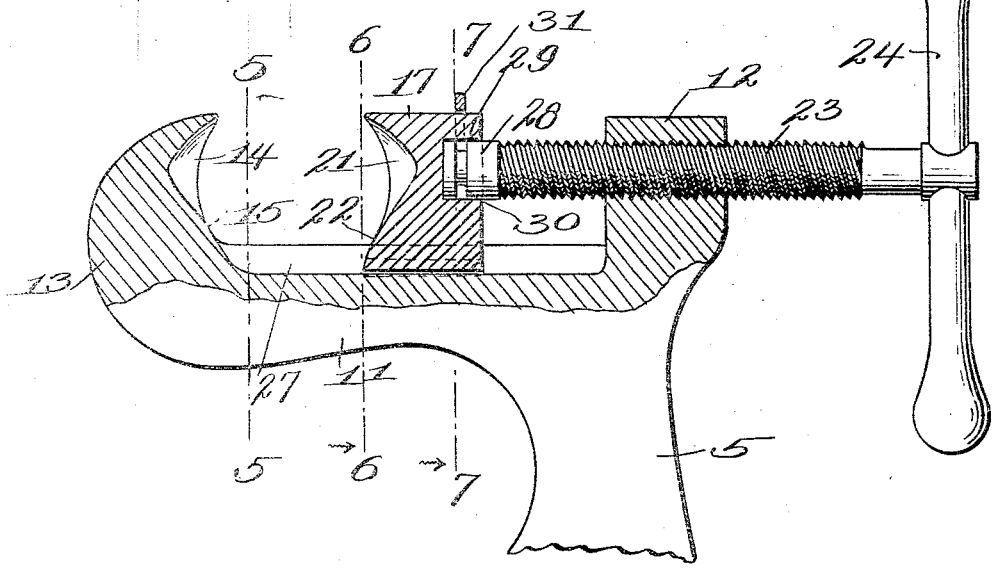
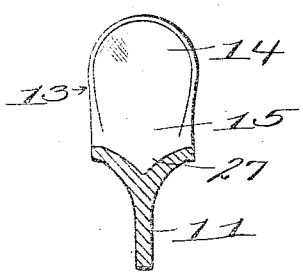
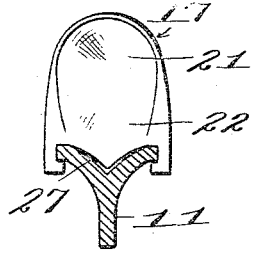
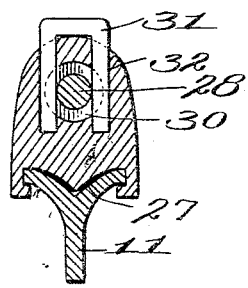
Witnesses:
C. F. Kesler
Morris L. Sumby
Inventor
Foster W. Fort
by
James L. Norris,
Attorney

UNITED STATES PATENT OFFICE.

FOSTER W. FORT, OF WACO, TEXAS.

NUTCRACKER.

1,117,945.  Specification of Letters Patent.  Patented Nov. 17, 1914.

Application filed July 12, 1913. Serial No. 778,807.

*To all whom it may concern:*

Be it known that I, FOSTER W. FORT, a citizen of the United States, residing at Waco, in the county of McLennan and State of Texas, have invented new and useful Improvements in Nutcrackers, of which the following is a specification.

This invention relates to nut crackers, and the primary object of the same is to provide a simple and effective device of this class adapted for cracking all kinds of nuts and readily applicable to a table or other analogous supporting means and operative to positively crack a nut with a comparatively small amount of applied power.

The improved nut cracker embodies a nut supporting arm which serves to hold one of the nut cracking jaws and also as a guide for the remaining jaw, the arm having an upper grooved surface and the opposing faces or ends of the jaws being provided with concavities or nut recesses which extend in part down to and intersect the groove of the arm at such an angle as to cause nuts placed on the arm to be automatically disposed in proper position between the jaws and thus render the nut cracker especially useful and effective in cracking pecans and nuts of that kind end to end, as well as certain classes of heavy nuts that may be better fractured by pressure exerted on opposite sides in contradistinction to an endwise pressure.

The invention also consists in certain details of construction and arrangement of the several parts which will be more fully hereinafter described and claimed.

In the drawings: Figure 1 is a perspective view of a nut cracker embodying the features of the invention. Fig. 2 is a longitudinal vertical section through a portion of the supporting arm and the jaws together with a part of the means for operating the movable jaw. Fig. 3 is a transverse vertical section taken in the plane of the line 3—3. Fig. 2. Fig. 4 is a longitudinal vertical section through a portion of the nut cracker embodying a slight modification. Figs. 5, 6 and 7 are respectively transverse vertical sections on the lines 5—5, 6—6 and 7—7, Fig. 4.

The numeral 5 designates an upright or standard having a clamp at its lower extremity and preferably comprising a fixed member 6 extending horizontally away from the upright and preferably integral with the latter and a movable member 7 carried on the upper end of a screw 8 having a lower handle 9, the screw 8 having bearing in the terminal of an inwardly extending angular arm 10 continuous with the bottom of the upright. Extending from the upper extremity of the upright or standard 5 and preferably integral therewith is an arm 11 having at its one end a threaded socket or guide 12 and at its opposite end a relatively fixed or stationary jaw 13 in longitudinal alinement with said socket. The inner end or face of the jaw 13 is formed with a concavity or depression 14 which has a lower tapered wall 15 extending downwardly to a groove 16 formed in the upper edge of the arm 11, the said groove as shown by Fig. 1 being of regular concave form in cross-section, as shown by Fig. 3. The lower portion of the wall 15 of the concavity or depression 14 intersects the groove 16, the latter terminating at the base of the said wall 15, and coöperating with the relatively fixed jaw 13 is a movable jaw 17 having a lower slot 18 and embracing flanges 19 to fit over and engage the opposite side portions of the upper edge of the arm 11, the said upper edge of the arm being laterally extended as at 20 to increase the width of the groove 16 relatively to the thinner portion of the arm below and also to provide flange means for engagement by the lower slotted portion of the jaw 17. The jaw 17 is also formed with a concavity or depression 21, said concavity or depression 21 being formed in the end or face of the jaw opposing the concavity or depression 14 in the jaw 13. The concavity or depression 21 also has a lower sloping wall 22 similar to the wall 15 of the concavity or depression 14 the said wall 22 extending fully down to and intersecting the groove 16 and conjointly acting with the said groove and the concavity 14 to automatically place a nut in proper cracking position between the two jaws without requiring the operator to hold the nut. The jaw 17 is movable or shiftable forwardly and backwardly on the upper edge of the arm 11 by means of a feed screw 23 engaging the socket 12 and having the outer handle or gripping bar 24 and an inner swivel head 25 rotatably held in a socket 26 in the outer or rear end of the said jaw 17.

In the modification shown by Figs. 4, 5, 6 and 7, the upper edge of the arm 11 is formed with a V-shaped groove 27 or a groove that inwardly converges, as clearly shown by Figs. 5, 6 and 7, but in other respects the arm and the jaws are constructed as in the form of the device shown by Figs. 1, and 3 and similar reference characters are applied thereto. The screw stem 23 in this instance is connected to the jaw 17 through the medium of a cylindrical head 28 fitted on a socket 29 in the outer end of said jaw and formed with a circumferential groove 30 which is preferably engaged by a U-shaped locking key 31 which may be readily withdrawn and disengage the jaw 17 from the screw stem, the U-shaped locking key being shown by Fig. 7. To receive the legs of this key the jaw 17 on opposite sides of the socket 29 is formed with openings 32. While the key 31 as shown is preferred, it will be understood that an analogous key might be used for separably holding the jaw 17 associated with the head 28 of the screw stem or feed screw 23. It is also proposed to modify the threads of the stem or feed screw 23 so that it may be made to run fast or slow and such other thread construction which is well known in the art of screw engagements may be adopted as found advantageous in the operation of the jaw 17.

In the operation of the improved nut cracker in either of its forms, a pecan nut will be placed between the jaws so that it will occupy a longitudinal position relatively to the arm, and if placed in the groove of the arm 11 the said nut will be drawn upwardly between the jaws without requiring the operator to hold the same. This operation is very effective in cracking hickory nuts, walnuts, and like hard nuts and where it is found that a side pressure in cracking the nut is preferable to a pressure exerted longitudinally of the nut, and in which case either of these latter nuts is simply disposed in the groove of the arm 11 and the jaw 17 operated through the medium of the feed screw 23 to operate the fixed jaw 13 and gradually draw the nut up into the cavities or depressions of the two jaws without requiring the nut to be held by the operator. As soon as the nut has been sufficiently cracked the jaw 17 is released or moved backwardly and the cracked nut may then be readily withdrawn.

The operation of cracking nuts may be expeditiously carried on through the medium of the improved nut cracker with a comparatively small amount of applied power and the rapidity of movement of the jaw 17 relatively to the jaw 13 will be governed solely by the character of the threads of the feed screw or screw stem 23.

It is proposed to construct the parts of the nut cracker of any suitable metal, and in the event that the jaw 17 becomes impaired or fractured or materially worn it may be replaced in either structure for the reason that the head 25 shown by Figs. 1 and 2 is held in the socket 26 through the medium of bendable lips or gripping devices 33, the said lips or gripping devices 33 being slightly thinner than the metal of the remaining portion of the jaw 17 and likewise the flanges 19 at the bases of the slots 18 are bendable to adapt the same to be applied to and removed from the upper edge of the arm 11. It will also be understood that changes in the proportions and dimensions of the several parts of the improved nut cracker may be adopted at will without departing from the spirit of the invention.

What is claimed is:

1. In a nut cracker, the combination of a supporting means having an angular arm with a relatively fixed jaw at one end and a screw-socket at the opposite end, the upper edge of the arm being longitudinally grooved to form a nut holding seat adapted to have a nut longitudinally placed therein, a jaw slidably mounted on the upper edge of the arm between the relatively fixed jaw and the screw-socket of the latter and having an operating feed screw engaging the said socket, the opposing faces of the two jaws being formed with rather deep cavities having lower inwardly sloping convex walls running down to and intersecting the groove of the arm, and means for holding the nut cracker as a whole in fixed applied position.

2. In a nut cracker, the combination of an arm having supporting means and provided with a relatively fixed jaw at one extremity, a movable jaw mounted on the arm in alinement with the relatively fixed jaw, both jaws having cavitied opposing sides, the upper edge of the arm being provided with a longitudinal groove in its upper edge extending from side to side thereof for causing a nut to automatically place itself in proper cracking position relatively to the two jaws, and the latter having lower sloping convex portions extending downwardly to and intersecting the groove of the arm and means for actuating the movable jaw.

3. In a nut cracker, the combination of a horizontal arm having means for supporting the same and provided with an upper longitudinally grooved edge and also with a relatively fixed jaw, the longitudinal groove in the upper edge of the arm extending from side to side of the latter, a slidable jaw removably mounted on the arm, the two jaws having cavities in their inner opposing faces with lower sloping convex walls continuing downwardly to the groove in the arm, and a feed screw means rotatably and separably connected to the movable jaw for actuating the latter.

In testimony whereof I have hereunto set my hand in presence of two subscribing witnesses.

FOSTER W. FORT.

Witnesses:
ENEX S. MCKENNEY,
J. F. BAUGH.